US011885572B2

(12) United States Patent
Sheehan (10) Patent No.: US 11,885,572 B2
(45) Date of Patent: Jan. 30, 2024

(54) HEAT EXCHANGER WITH INTEGRATED TESTING SYSTEM

(71) Applicant: Unison Engineering Services Limited, Limerick (IE)

(72) Inventor: Paul Sheehan, Limerick (IE)

(73) Assignee: Unison Engineering Services Limited, Limerick (IE)

(*) Notice: Subject to any disclaimer, the term of this patent is extended or adjusted under 35 U.S.C. 154(b) by 876 days.

(21) Appl. No.: 16/960,436

(22) PCT Filed: Jan. 8, 2019

(86) PCT No.: PCT/EP2019/050320
§ 371 (c)(1),
(2) Date: Jul. 7, 2020

(87) PCT Pub. No.: WO2019/141538
PCT Pub. Date: Jul. 25, 2019

(65) Prior Publication Data
US 2020/0337322 A1    Oct. 29, 2020

(30) Foreign Application Priority Data

Jan. 16, 2018  (IE) ..................................... 2018/0009

(51) Int. Cl.
*A23C 3/033*    (2006.01)
*A23L 3/20*     (2006.01)
(Continued)

(52) U.S. Cl.
CPC ................ *F28D 9/00* (2013.01); *A23C 3/033* (2013.01); *A23C 3/0332* (2013.01);
(Continued)

(58) Field of Classification Search
CPC ........ G01M 3/2815; G01M 3/28; G01M 3/32; A23L 3/16; A23L 3/22; A23C 3/033; A23C 3/0337; A23C 3/0332
See application file for complete search history.

(56) References Cited

U.S. PATENT DOCUMENTS 5,360,055 A  11/1994  Hup et al.
6,136,362 A  10/2000  Ashton
(Continued)

FOREIGN PATENT DOCUMENTS

DE  4408073 A1  12/1994
DE  19534855 C1  6/1997
EP  2438420 B1  5/2013

OTHER PUBLICATIONS

International Search Report issued in PCT/EP2019/050320; dated Apr. 9, 2019.

*Primary Examiner* — Reginald Alexander
(74) *Attorney, Agent, or Firm* — Studebaker & Brackett PC (57) ABSTRACT

A heat exchanger apparatus has a heating stage with a product side and a hot water side and a cooling stage with a product side and a coolant side, and also regeneration stages with treated and un-treated product sides. There are valves including a cooling stage outlet valve, and pressure sensors, and pumps for pumping process liquid through the product sides. A PLC controller is programmed to operate the pumps with outlet valves closed to pressurize the product sides of the stages at a pressure dynamically maintained by control of the pumps in response to sensed pressure. The valves are controlled to firstly vent the heating and cooling sides of the heating and cooling stages with the product sides pressurized, and then in a second phase to vent the downstream (treated) product sides of regeneration stages. Also, an in-line holding time test is performed by monitoring time (Continued)

for step rises in temperature to reach a temperature sensor and the outlet end of a holding tube.

11 Claims, 3 Drawing Sheets

(51) Int. Cl.
    *F28D 9/00*     (2006.01)
    *A23L 3/00*     (2006.01)
    *G01M 3/28*     (2006.01)
    *A23L 3/22*     (2006.01)
    *G01M 3/32*     (2006.01)

(52) U.S. Cl.
    CPC ............ *A23C 3/0337* (2013.01); *A23L 3/003* (2013.01); *A23L 3/20* (2013.01); *A23L 3/22* (2013.01); *G01M 3/2815* (2013.01); *F28F 2200/00* (2013.01); *F28F 2265/16* (2013.01); *G01M 3/32* (2013.01)

(56) References Cited

U.S. PATENT DOCUMENTS

| | | | |
|---|---|---|---|
| 7,644,654 B2 * | 1/2010 | Nielsen | A23L 3/20 |
| | | | 165/206 |
| 2003/0034146 A1 | 2/2003 | Kaufman | |
| 2004/0129061 A1 | 7/2004 | Rabelle | |
| 2011/0027441 A1 | 2/2011 | Deane et al. | |
| 2011/0318463 A1 * | 12/2011 | MacGregor | A23C 3/033 |
| | | | 134/22.12 |
| 2016/0192669 A1 * | 7/2016 | Lauzon | A23C 3/033 |
| | | | 426/330.2 |
| 2017/0261398 A1 | 9/2017 | Bowling | |

* cited by examiner

HEAT EXCHANGER WITH INTEGRATED TESTING SYSTEM

INTRODUCTION

The invention relates to a heat exchanger system, such as multi-plate heat exchangers such as for example for pasteurisation of milk.

EP2438420 describes heat exchanger integrity testing.

DE4408073 (Feis W.) describes pasteurisation of milk in which there is a pressure differential of at least 0.5 Bar in favour of the flow paths of the pasteurised milk.

DE19534855 (Schaele W) describes a heat exchanger arrangement for milk in which there is heat recovery.

US2004/0129061 (Rabelle) describes a device for detecting a leak between circuits of a plate-type heat exchanger.

US2011/0027441 (Deane) describes an arrangement for sterilizing liquid, in which an output channel is adjacent an input channel.

At present testing of heat exchanger systems is typically time-consuming and complex, requiring skilled personnel to make the necessary circuit connections.

Presently most multi-section plate heat-exchangers and most critical-to-production plate heat-exchangers (PHE) must be validated regularly by carrying out an integrity test and a holding time test (to pasteurisers only). This is typically done by outside contractors coming on site, dismantling the pipes from the PHE and then carrying out the test, resulting in a pass or fail. This has to be done between production runs at high costs, due to the system having to be dismantled and drained for the test, resulting in draining costly product liquids, the introduction of possible contaminants through the various testing procedures and also leaking fittings on plant following start up after on-site testing.

The invention is directed towards achieving a much greater frequency of testing and level of automation in heat exchanger testing and the end user having full control over validation of their process equipment and avoidance of reliance on outside contractors for this.

SUMMARY OF THE INVENTION

We describe a heat exchanger apparatus comprising:
- a heating stage with a product side and a heating fluid side;
- a cooling stage with a product side and a coolant side;
- at least one product outlet valve;
- at least one pressure sensor;
- at least one pump;
- a controller configured to perform an integrity test by control of said at least one pump and said at least one valve by:
    - causing a low pressure of fluid in the heating fluid side and/or the coolant sides, pressurising the product sides of said heating and cooling stages at a pressure dynamically maintained by control of the pumps in response to sensed pressure, and
    - sensing pressure in one or both of the heating fluid side and the coolant side, and detecting a leak if said pressure rises excessively.

Optionally, the controller is configured to pressurise the product sides of both of said heating and cooling stages simultaneously as said sides are interconnected. Optionally, the controller is configured to cause said low pressure by controlling a valve to vent said side and then to seal the side.

Preferably, the controller is configured to cause said low pressure after flow of a liquid into said heating fluid and/or coolant sides.

Optionally, a pump is linked with the product line inlet via valves which are operable by the controller to isolate a product supply. Optionally, the apparatus includes a product supply tank, and said valves are operable to isolate said product supply tank. Optionally, wherein the apparatus includes a holding tube in the product line between said heating and cooling stages.

Optionally, the apparatus includes a temperature sensor at an inlet of said holding tube and a temperature sensor at an outlet of said holding tube, and the controller is configured to perform a holding tube dwell time test by monitoring a time duration taken for a set temperature increase detected at the inlet sensor to be detected at the outlet temperature sensor, as an indication of dwell or holding time in the holding tube.

Optionally, the controller is configured to repeat a holding tube dwell time test a plurality of times and to determine an average time duration as a test output. Optionally, the controller is configured to perform said dwell time test during production, in which product is a medium in the holding tube.

Preferably, the apparatus further comprises at least one regeneration stage between said heating and cooling stages the product line extending from the heating stage, through the or each regeneration stage, and finally through the cooling stage to give up heat to incoming un-treated product and to be cooled to a final product desired temperature.

Optionally, an inlet side of the product line enters the regeneration stage and then through the heating stage, providing in the regeneration stage:
- a raw product line which is pre-heated in a first side of the regeneration stage before final heating in the heating stage, and
- a treated product line which enters the regeneration stage in an opposed, second side to give up heat to un-treated product.

Optionally, the controller is configured to perform an integrity test in:
- a first phase by pressurising the product inlet and outlet sides with the heating and cooling stage heating and cooling fluid sides at low pressure, so that the heating and cooling stages have high pressure on one side and low pressure on the other side, and in a second phase in which the regeneration stages are vented on one side by valve control and subsequently closed, so that one side of each regeneration stage is under high pressure and the other side is under low pressure, and wherein the controller is configured to monitor pressure in the low-pressure side and to generate a fail output if the pressure in the low-pressure side rises excessively, such as above a set point.

Optionally, the controller is configured to vent an untreated product side for said second phase. Optionally, the apparatus is configured to perform a back-pressure operation on each of the heating and cooling stages by venting the product sides and pressuring the heating and cooling fluid sides by pump and valve control for a minimum duration, sufficient to cause removal of any debris from said stages.

Preferably, the controller is configured to perform said back-pressure operation in advance of integrity testing. Preferably, the apparatus is a pasteuriser, in which said controller is configured to operating the stages for milk pasteurising. Optionally, the apparatus comprises a mobile frame and all components of the apparatus are mounted on said frame.

ADDITIONAL STATEMENTS

We describe a heat exchanger system comprising:
a heating stage with a product side and a heating fluid side;
a cooling stage with a product side and a coolant side;
a heating stage outlet valve;
a cooling stage outlet valve;
pressure sensors;
pumps for pumping process liquid through the product sides;
a controller configured to operate the pumps with the outlet valves closed to pressurise the product sides of said stages at a pressure dynamically maintained by control of the pumps in response to sensed pressure.

Preferably, a pump is linked with the product line inlet via valves which are operable by the controller to isolate a product supply.

Preferably, the apparatus includes a product supply tank, and said valves are operable to isolate said tank.

Preferably, the apparatus includes a holding tube in the product line between said heating and cooling stages.

Preferably, the apparatus includes a temperature sensor at an inlet and a temperature sensor at an outlet of said holding tube, and the controller is configured to perform a holding tube dwell time test by monitoring a time duration taken for a set temperature increase detected at the inlet sensor to be detected at the outlet sensor, as an indication of dwell or holding time in the holding tube.

Preferably, the controller is configured to repeat a holding tube dwell time test a plurality of times and to determine an average time duration as a test output.

Preferably, the controller is configured to perform said dwell time test during production, in which product is a medium.

Preferably, the apparatus further comprises at least one regeneration stage between said heating and cooling stages the product line extending from the heating stage, through the or each regeneration stage, and finally through the cooling stage to give up heat to incoming un-treated product and to be cooled to a final product desired temperature.

Preferably, an inlet side of the product line enters the regeneration stage and then through the heating stage, providing in the regeneration stage:
a raw product line which is pre-heated in a first side of the regeneration stage before final heating in the heating stage, and
a treated product line which enters the regeneration stage in an opposed, second side to give up heat to un-treated product.

Preferably, the controller is configured to perform an integrity test in:
a first phase by pressuring the product inlet and outlet sides with the heating and cooling stage heating and cooling fluid sides at low pressure, so that the heating and cooling stages have high pressure on one side and low pressure on the other side, a second phase in which the regeneration stages are vented on one side by valve control and subsequently closed, so that one side of each regeneration stage is under high pressure and the other side is under low pressure, and the controller is configured to monitor pressure in the low-pressure side and to generate a fail output if the pressure in the low-pressure side rises above a set point.

Preferably, the controller is configured to vent an un-treated product side for said second phase.

Preferably, the apparatus is configured to perform a back-pressure operation on each of the heating and cooling stages by venting the product sides and pressuring the heating and cooling fluid sides by pump and valve control for a minimum duration, sufficient to cause removal of any debris from said stages. Preferably, the controller is configured to perform said back-pressure operation in advance of integrity testing. Preferably, the apparatus is a pasteuriser, in which said controller is configured to operating the stages for milk pasteurising. Preferably, the apparatus comprises a mobile frame and all components of the apparatus are mounted on said frame.

DETAILED DESCRIPTION OF THE INVENTION

The invention will be more clearly understood from the following description of some embodiments thereof, given by way of example only with reference to the accompanying drawings in which:—

Figure 1:
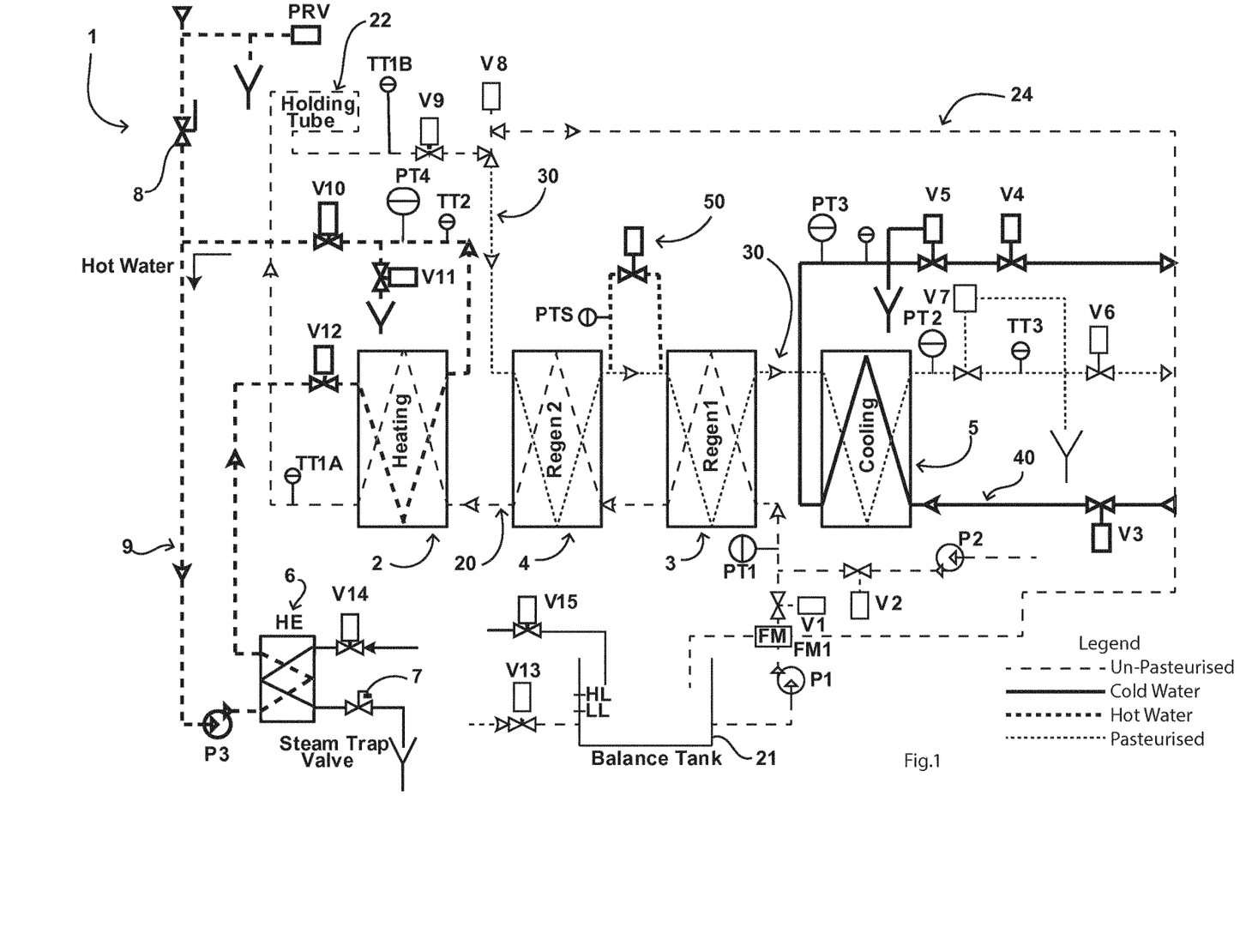
FIG. 1 is a process diagram showing a heat exchanger of the invention.

Referring to FIG. 1 a heat exchanger system 1 comprises four main stages:
2, Heating;
3, Regeneration I;
4, Regeneration II; and
5, Cooling.

Each stage 2, 3, 4, and 5 comprises a bank of plate heat exchange (HE) elements of conventional construction.

Advantageously, the controller is programmed to not only control normal operation of the system 1, but to also automatically perform testing and generate test reports. This is for compliance with operational quality control (QC) and regulatory requirements.

The stages are connected in circuits as shown in FIG. 1, with valves, pumps and sensors connected to a PLC controller. The PLC controller is programmed to control and monitor operation of pumps P1, P2 and P3 at various stages of testing procedures, operating valves between V1 to V15, depending of what stage test is carried out, monitoring the pressures at PT1, PT2, PT3 and PT4 and also the temperatures on TT1A, TT1B, TT2 and TT3 and flow rate on FM1. All of the pumps, valves and instrumentation are supplied with the system if system or they could be retro-fitted. The result of every test is stored in the controller's memory for downloading when required.

Heating Stage 2

In this stage alternate elements for one side are connected in a hot water circuit 9 including:
6, a brazed HE heater receiving steam via a valve V14, and having a steam trap valve 7;
P3, hot water pump, upstream of the brazed HE heater 6;
V12, valve at inlet of the stage elements 2;
V11, valve at outlet of the stage elements 2, for venting and drain access;
V10, main valve at outlet of the stage elements 2;
TT2, PT4, temperature and pressure gauges respectively at the outlet side of the stage 2.

The other side of the stage 2 is in an un-treated product (e.g. unpasteurized milk) line 20. The line 20 also includes one side of each of the regeneration stages 3 and 4.

Un-Treated Product Line 20

V15, is a cold water supply valve to the pasteuriser balance tank 21, and is used for filling the pasteuriser for pre-production, flushing after production and rinsing the pasteuriser after washing. The tank lever is controlled by LL (low level sensor) and HL (High level sensor) in the balance tank 21. This is the same process water that is used for the testing via V2 and P2.

- 21, Product supply, or balance, tank filled via the valve V13; (raw product is supplied to the pasteuriser only via V13);
- V13, Raw Product supply valve to balance tank 21;
- P1, Supply pump to heat exchanger stages;
- V1, Supply valve, normally open ("NO") during operation;
- V2, Isolation valve, to isolate the test branch (pump P2);
- P2, Test pump, activated during integrity testing;
- PT1, Pressure sensor at inlet of the regeneration stage 3;
- TT1A, Temperature sensor, at outlet of the heating stage 2 (at the start of the holding tube);
- 22, Holding tube, in a looped arrangement overhead, to provide a desired product dwell time at a particular temperature after heating in the heating stage 2, so that the product is fully treated (for example, if milk, that the pasteurising level is held for a required time);
- TT1B, temperature sensor at the end of the holding tube;
- V9, Valve at end of the holding tube, used for testing only;
- V8, Three-way diversion valve providing access to a diversion line 24 to the balance tank 21 for use only during production. The V8 Diversion valve is used during production to ensure that only pasteurised milk (product) is sent forward through the pasteuriser i.e. if the milk is not up to the pasteurising set temperature (minimum 72° C. at TT1B) the milk is returned to the balance tank from V8 and recirculated until the temperature is above the pasteurising set temperature at TT1B, activating V8 only then letting the pasteurised milk through the pasteuriser to fully process it by allowing the milk downstream (treated product line 30) into the regeneration sections 4 and 3 and finally into the cooling section to exit as pasteurised milk.

Treated Product Line 30

The un-treated product circuit elements are on one side of the stages 2, 3, and 4. In the stage 2 the other side is in the hot water circuit 9. In the regeneration stages 3 and 4 the other sides are in a treated product line 30 which begins with the end of the holding tube 22.

The treated product line 30 then extends through alternate elements of the stages 4 and 3 respectively and then into one side of the cooling stage 5, at the outlet of which there are:
- PT2, pressure sensor;
- V7, valve to drain;
- TT3, temperature sensor; and
- V6, treated product outlet valve.

Chilled Water Circuit 40

Finally, the other side of the cooling stage 5 is in a chilled water circuit 40 having
- V3, chilled water supply valve at inlet to the stage 5;
- PT3, pressure sensor at stage 5 outlet;
- V5, valve to drain or vent (all drain valves are also configured for venting); and
- V4, valve for outlet of chilled water to a chilling unit.

Advantageously all of the temperature sensors are in-line, in direct contact with the relevant fluid. Hence there is no need to calibrate for aspects such as tube wall conductivity.

The full apparatus 1 is mounted on a mobile (or fixed) frame, for compactness and ease of positioning.

Operation

Product Treatment

In normal operation raw, unpasteurized milk is fed from the balance tank 21 in the line 20 in which it is progressively heated by the regeneration stages 3 and 4 and the heating stage 2 respectively. The stages 3 and 4 gradually rise the temperature from ambient by use of heat recovered from the already-treated milk in the line 30. The heating stage 2 performs the critical final phase of heating to above 72° C. The steam control valve V14 and the heater 6 are used to control the level of heat inputted into the heating stage 2. With the valves V12 and V10 open there is continuous flow of hot water in the circuit 9 to boost the milk temperature to above 72° C. and the holding tube 22 provides the desired dwell time (for example fifteen seconds).

Recovery of Heat from Treated Product, and its Final Cooling

The treated milk then enters the line 30 by operation of the three-way diversion valve V8. This brings it through a side of each stage 4 and 3 in turn to transfer heat to the incoming raw milk in the line 20. The temperature drop across the stages 4 and 3 is typically 88-90%, depending on the design of the pasteuriser.

The treated milk is then routed through the cooling stage 5 where it is cooled to a desired chill temperature of say 4° C. and is delivered out of the system 1 via the valve V6. This provides the final output product.

Holding Time Test

This can be performed dynamically during production, and can be carried out when the pasteuriser is running on water or on product.

The flow rate of the pasteuriser is set and confirmed using the flow meter FM1.

TT1A and TT1B are synchronised so that both are reading the exact same temperature or the difference between both TT1A and TT1B is stabilised and constant.

V14 and the heater 6 are controlled to increase temperature in the circuit 9 by for example 1° C. TT1A is monitored to detect a set rise, for example 0.5° C. When this happens, a clock is activated to determine time duration until the same (0.5° C.) temperature rise occurs at the end of the holding tube 22 (at TT1B).

This is repeated a number (for example, 5) of times. The time durations are averaged to provide an output time duration for travel of the product from TT1A to TT1B, i.e. dwell or holding time in the holding tube 22.

This dynamic check of dwell time does not need any flow sensors or any components additional to those which are used for production. For this test a flow meter FM1 must be installed to validate and confirm that the flow rate is as required.

Back-Pressure Treatment Heating and Cooling Stages 2 and 5

Water is pumped by P3 with V12 open, and V11 and V10 closed. Hence, pressure is applied in this side of the stage 2 while the other side is vented by V9 being open, and V8 being open to the balance tank 21.

Hence, the hot water side of the heating stage 2 is pressurised on the opposite side of the plates than the integrity test is carried out on, to dislodge any possible debris that may present as to make the test more accurate.

A similar operation is carried out in the cooling stage 5, with water being pumped by the supply (not shown) with V3 open, and V5 and V4 closed to provide a "dead-end".

Doing this pre-testing will make the integrity test more accurate. For the heating section the system does not require to monitor the pressure on PT1 and PT4 during the back pressuring to ensure that there is back pressure being applied to hot water sections with pressure on PT4 and other side of this section is vented confirmed by no pressure on PT1.

Doing this pre-testing will make the integrity test more accurate. For the cooling section the system does not require to monitor the pressure on PT2 and PT3 during the back pressuring. It ensures that there is back pressure being applied to chilled water sections with pressure on PT3 and other side of this section is vented confirmed by no pressure on PT2.

Integrity Test

This includes all of the stages 2-5.

Lines 20 and 30:

Close V10 and V12, open V11 to vent one side of stage 2 (hot water side).

Close V3 and V4, open V5 to vent one side of stage 2 (chilled water side).

V1 closed, and V2 opened, to isolate the balance tank 21.

V9 is opened, as for normal operation of the line 20.

V8 activates to forward flow position to pressurise both sides of the plates i.e., route the test liquid (for example water) into the line 30 as a continuation of the line 20, so that the lines 20 and 30 form a circuit.

V6 is closed, thereby dead-ending the circuit formed by the lines 20 and 30.

V7 is opened, thereby venting the circuit formed by the lines 20 and 30.

Activate P2 to pump test water into the circuit formed by the lines 20 and 30.

V7 is closed (thereby dead-ending the circuit formed by the lines 20 and 30) until the pressure sensed by PT2 reaches a target (say 6 Bar) and P2 is controlled to maintain this pressure even with plate element thermal expansion effects.

With pressure maintained on PT2 at the required testing pressure (say 6 Bar) V5 and V11 are closed so that the opposite sides of the stages 2 and 5 are now a sealed chamber. Also, there is a pressure of 6 Bar now on one side (product side) of stage 2 and 5, maintained by P2. There will also now be a low pressure (near 0 Bar) on the opposite side of 2 and 5 due to the venting of stages 2 and 5, done by the venting and sealing of valves V5 and V11 in the stages 2 and 5. Hence, at this stage, the product sides are pressurised and the opposite sides (hot water and coolant respectively) of the stages 2 and 3 have been filled with test water, vented so that this is at atmospheric pressure, and are now sealed.

Figure 2:
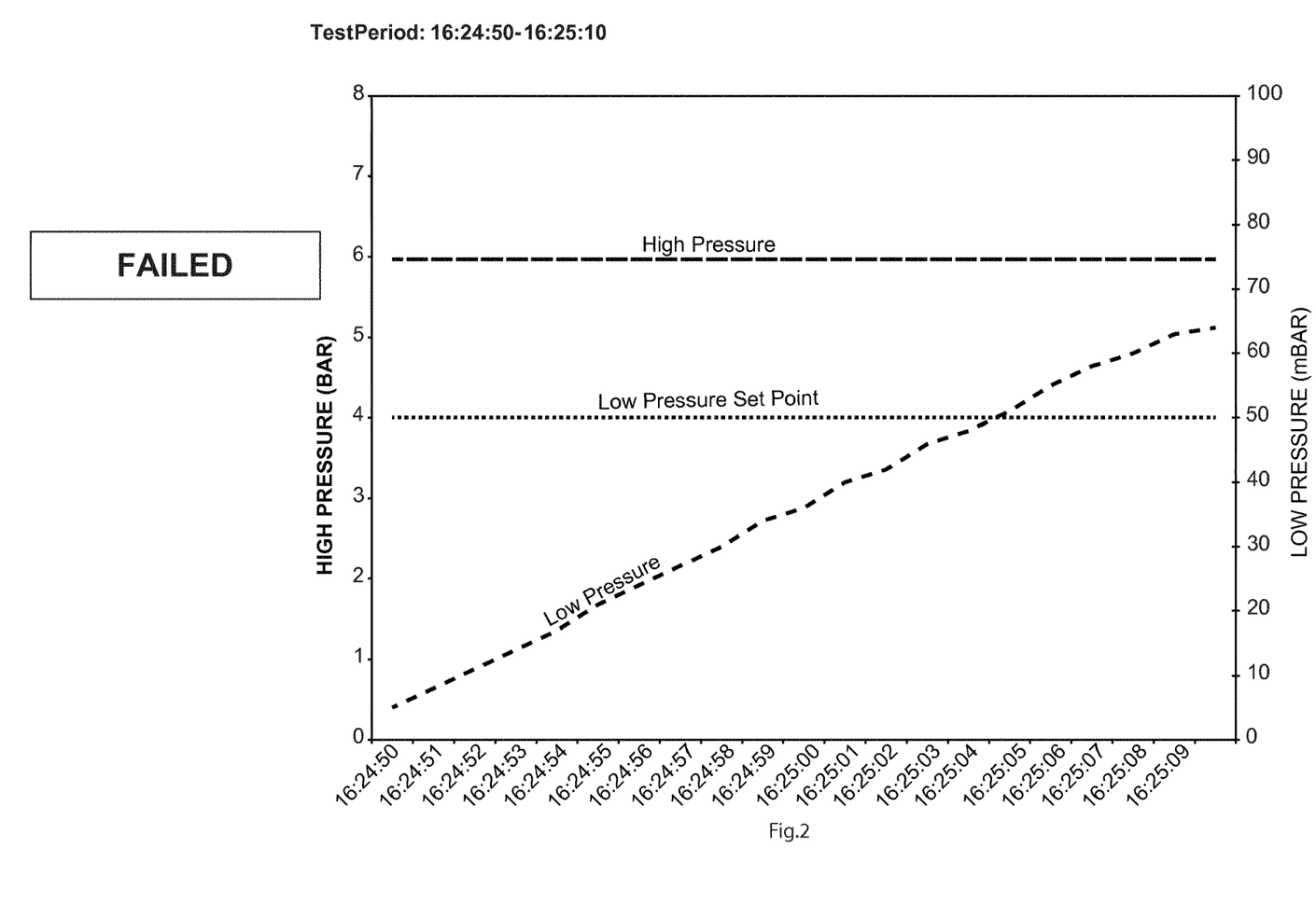
FIGS. 2 and 3 are plots showing test outputs.
Figure 3:
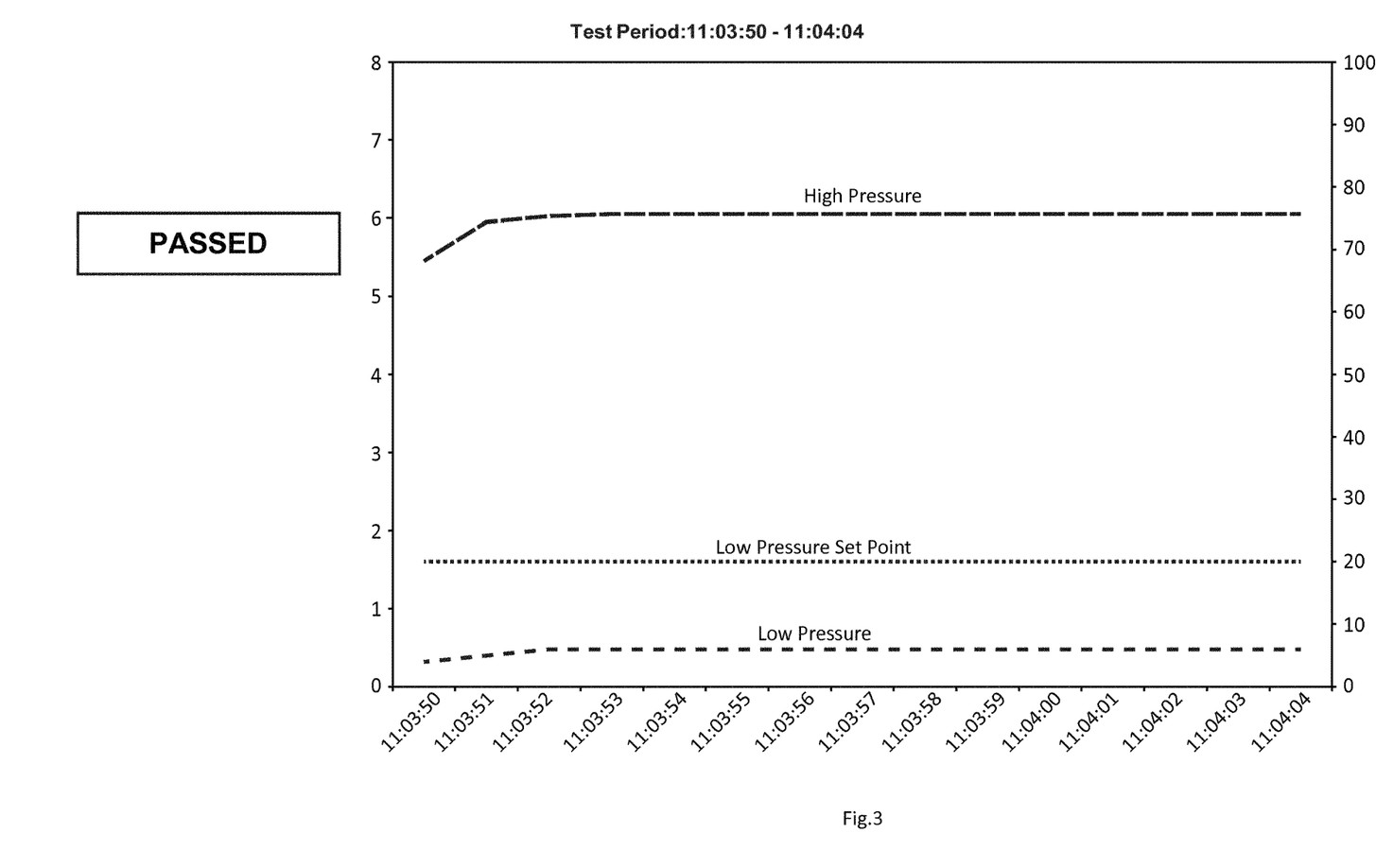

Referring to FIGS. 2 and 3, the pressure is monitored at PT4 and PT3 for undesired pressure rise in the hot water and coolant sides ("low pressure" sides) of the stages 2 and 5. The low pressure side of each stage should be near a stable 0 Bar, and this is monitored for the duration of the test. If there is a rise in this low pressure until it reaches an adjustable set point, say 0.100 mB, this is a fail. For a pass test the low-pressure side must stay at a constant low pressure for the duration of the test. Pressure changes in the low pressure sides could alternatively be monitored by a flow meter in addition to or instead of a pressure sensor.

At this stage only the heating and cooling stages 2 and 5 are tested, because they are the only sections with a controlled high and low pressure on either side of the plates. The testing of the product sides is integrated because they are linked as the combined circuit 20/30.

Regeneration Stage Tests

When the hot water and chilled water stage tests are finished the valves V10, V12, V3, and V4 are closed and V5 and V11 stay open for the duration of the regeneration stages test.

V9 is closed, V8 is closed to balance tank (activated) and V7 is opened, and V6 is closed so that V9 dead-ends to pressurise the raw product sides of 3 and 4 from P2, the treated product side being vented. Again, the pressure is brought by control of the pump P2 to about 6 Bar. This pressure is monitored by PT1.

Then with high pressure stable at PT1 from P2, PT2 is monitored so that it is now at a low pressure of near 0 Bar, V7 is closed. V7 is now closed to create a sealed low pressure in the stages 4 and 3 from V9 to V6. There is now a high pressure of 6 Bar from P2 up to V9 and a sealed low pressure from V9 through V8 down to V6. The low side of the sections 3 and 4 should be near a stable 0 Bar, and this is monitored for the duration of the test. If there is a constant rise in this low pressure until it reaches an adjustable set point, say 0.100 mB, this is a fail (FIG. 2), for it to be a pass (FIG. 3) the low pressure must stay at a constant low pressure for the duration of the test.

Additional, Optional Tests

There is a valve 50 between the two regeneration stages 3 and 4 for optional isolation of these stages for individual testing. If there are multiple sections in the re-generation that require to be tested separately than a valve and pressure transmitter can be installed between each section then the method for testing the regeneration stage test can be carried out on each individual regeneration section.

Advantages

It will be appreciated that the full integrity testing achieves a first phase of testing of the heating and cooling stages 2 and 5, followed immediately by testing of the regeneration stages 3 and 4. These are performed after back flushing of the heating and cooling stages 2 and 5 so that any small cracks are free of debris.

It will also be appreciated that the testing is carried out by operating integrated pumps and valves and detecting test results with integrated sensors without the need to dismantle any pipes. This allows an integrity test to be carried daily prior to production.

Also, the system avoids a need for outside contractors to test the equipment as the operator is able to test their own equipment, allowing them to validate their critical process equipment before going into production on a daily basis, preventing cross contamination daily and any possible product recall. The system allows the operator to test their own PHE prior to going into production daily.

Another advantage is that by using the pump to maintain a constant accurate high pressure on the high pressure side the system avoids false fails which might arise due to a leaking gasket or fitting which would vent to atmosphere but not to the other heat exchange side, i.e. it would not cause a leak from one heat exchange side plate to the other.

Alternatives

The invention is not limited to the embodiments described but may be varied in construction and detail. The system is not necessarily for milk treatment, and the product may be of any other type, such as an alcohol product or other beverage. Also, the testing fluid used may be a gas or a liquid. It is envisaged that the system controller be programed to perform integrity tests on individual stages, such as the heating stage 2 and the cooling stage 5. This may involve pressurising either side, the other side being vented so that the liquid (typically water) in it is at atmospheric pressure, and sealed. Also, during the integrity test a leak may be detected by sensing pressure in the low-pressure (vented and sealed) side by either a pressure sensor or by any other sensor which can sense an increase in pressure arising from a leak from the high pressure side, such as a flow meter. Also, the system may include a temperature sensor to detect ambient temperature and so thereby allow the controller to compensate for excessive expansion. This applies especially on the low pressure side as the liquid on that side may have a minor expansion caused by heating (especially if the volume is very small) which would affect the pressure readings. Also, where it is described that pumps of the system deliver a fluid into parts of the system, this may alternatively be performed by external pumps such as those of a mains water supply, possibly regulated by components of the system.

In an alternative arrangement we also describe a heat exchanger apparatus that has the controller, a heating stage 2 with a product side and a heating fluid side, a heating stage outlet valve V9, at least one pump P2, P3, and a holding tube 22 in a product line downstream of the heating stage. There are not necessarily a cooling stage or regeneration stages. There is a temperature sensor TT1A at an inlet of the holding tube 22 and a temperature sensor TT1B at an outlet of the holding tube 22, and the controller performs a holding tube dwell time test by monitoring a time duration taken for a set temperature increase detected at the inlet sensor to be detected at the outlet temperature sensor TT1B, as an indication of dwell or holding time in the holding tube 22. The controller preferably repeats a holding tube dwell time test a number of times to determine an average time duration as a test output. Preferably, the controller performs the dwell time test during production, in which case the product is the medium in the holding tube. If there is a cooling stage the dwell tube would be between the heating stage product outlet and the cooling stage product inlet.

Also, as noted in the description above of the main integrity test, the valve V9 is open for full linking of the lines 20 and 30 and plays no role in sealing for pressurising these sides. V9 is therefore not required for this test. However, as it is present it may be used to dead-end all or part of the product line for the test, possibly with the heating and cooling stages being tested individually. Also, where the heating and cooling stages are tested separately, a test may be carried out as described above but with the sides being reversed: heating or coolant sides being pressurised and product sides being at low pressure and monitored.

The invention claimed is:

1. A heat exchanger apparatus comprising:
a heating stage with a product side and a heating fluid side;
a cooling stage with a product side and a coolant side, wherein said product sides of said heating and cooling stages are interconnected;
at least one regeneration stage between said heating and cooling stages the product line extending from the heating stage, through the or each regeneration stage, and finally through the cooling stage to give up heat to incoming un-treated product and to be cooled to a final product desired temperature, wherein an inlet side of the product line enters the regeneration stage and then through the heating stage, providing in the regeneration stage:
a raw product line which is pre-heated in a first side of the regeneration stage before final heating in the heating stage,
a treated product line which enters the regeneration stage in an opposed, second side to give up heat to un-treated product;
at least one product outlet valve;
at least one pressure sensor;
at least one pump, and
a controller,
wherein:
the apparatus is configured to perform a back-pressure operation on each of the heating and cooling stages by venting the product sides and pressuring the heating and cooling fluid sides by control of said at least one product outlet valve and said at least one pump for a minimum duration, sufficient to cause removal of any debris from said stages;
the controller is configured to perform, after said back-pressure operation, an integrity test by control of said at least one pump and said at least one product outlet valve by:
causing a low pressure of fluid in the heating fluid side and the coolant sides, by controlling said at least one product outlet valve to vent each said side and then seal the side after flow of a liquid into said heating fluid and coolant sides;
simultaneously pressurizing the interconnected product sides of said heating and cooling stages at a pressure dynamically maintained by control of the pumps in response to sensed pressure; and
sensing pressure in one or both of the heating fluid side and the coolant side, and detecting a leak if said pressure rises excessively;
said at least one pump is linked with the product line inlet via valves which are operable by the controller to isolate a product supply, and
the controller is configured to perform an integrity test in:
a first phase by pressurizing the product inlet and outlet sides, with the heating and cooling stage heating fluid and coolant sides at low pressure, so that the heating and cooling stages have high pressure on one side and low pressure on the other side, and in
a second phase in which the or each regeneration stage is vented on one side by said at least on product outlet valve control and subsequently closed, so that one side of each regeneration stage is under high pressure and the other side is under low pressure, and
wherein the controller is configured to monitor pressure with a said at least one pressure sensor and/or monitor flow with a flow meter in the low-pressure side and to generate a fail output if the pressure in the low-pressure side rises excessively and/or if a flow causing a pressure rise is detected by said flow meter.

2. The heat exchanger apparatus as claimed in claim 1, wherein the apparatus includes a product supply tank, and said valves are operable to isolate said product supply tank.

3. The heat exchanger apparatus as claimed in claim 1, wherein the apparatus includes a holding tube in the product line between said heating and cooling stages.

4. The heat exchanger apparatus as claimed in claim 1, wherein the apparatus includes a holding tube in the product line between said heating and cooling stages; and wherein the apparatus includes a temperature sensor at an inlet of said holding tube, and a temperature sensor at an outlet of said holding tube, and the controller is configured to perform a holding tube dwell time test by monitoring a time duration taken for a set temperature increase detected at the inlet sensor to be detected at the outlet temperature sensor, as an indication of dwell or holding time in the holding tube.

5. The heat exchanger apparatus as claimed in claim 1, wherein the apparatus includes a holding tube in the product line between said heating and cooling stages; and wherein the apparatus includes a temperature sensor at an inlet of said holding tube, and a temperature sensor at an outlet of said holding tube, and the controller is configured to perform a holding tube dwell time test by monitoring a time duration taken for a set temperature increase detected at the inlet sensor to be detected at the outlet temperature sensor, as an indication of dwell or holding time in the holding tube; and wherein the controller is configured to repeat a holding tube dwell time test a plurality of times and to determine an average time duration as a test output.

6. The heat exchanger apparatus as claimed in claim 1, wherein the apparatus includes a holding tube in the product line between said heating and cooling stages; and wherein the apparatus includes a temperature sensor at an inlet of said holding tube, and a temperature sensor at an outlet of said holding tube, and the controller is configured to perform a holding tube dwell time test by monitoring a time duration taken for a set temperature increase detected at the inlet sensor to be detected at the outlet temperature sensor, as an indication of dwell or holding time in the holding tube; and wherein the controller is configured to perform said dwell time test during production, in which product is a medium in the holding tube.

7. The heat exchanger apparatus as claimed in claim 1, wherein the controller is configured to vent an un-treated product side for said second phase.

8. The heat exchanger apparatus as claimed in claim 1, wherein the apparatus is a pasteurizer, in which said controller is configured to operating the stages for milk pasteurizing.

9. The heat exchanger apparatus as claimed in claim 1, wherein the apparatus comprises a mobile frame and all components of the apparatus are mounted on said frame.

10. The heat exchanger apparatus as claimed in claim 1, wherein the apparatus includes a holding tube in the product line between said heating and cooling stages; and wherein the apparatus includes a temperature sensor at an inlet of said holding tube, and a temperature sensor at an outlet of said holding tube, and the controller is configured to perform a holding tube dwell time test by monitoring a time duration taken for a set temperature increase detected at the inlet sensor to be detected at the outlet temperature sensor, as an indication of dwell or holding time in the holding tube; and wherein the controller is configured to synchronize said temperature sensors so that they are both reading the exact same temperature or the difference between them is stabilized and constant, and wherein a valve and a heater are controlled to increase temperature in the product line, the inlet temperature sensor is monitored to detect a set rise and a clock is activated to determine time duration until the same temperature rise occurs at the end of the holding tube.

11. The heat exchanger apparatus as claimed in claim 1, wherein the apparatus includes a temperature sensor to detect ambient temperature, and the controller is configured to used sensed ambient temperature to compensate for excessive expansion on a low-pressure side.

* * * * *